United States Patent [19]
Caveney et al.

[11] Patent Number: 5,998,732
[45] Date of Patent: Dec. 7, 1999

[54] RACEWAY OUTLET STATION

[75] Inventors: Jack E. Caveney, Hinsdale; Randall T. Woods, Bartlett; Charles VanderVelde, Frankfort, all of Ill.

[73] Assignee: Panduit Corp., Tinley Park, Ill.

[21] Appl. No.: 09/006,663

[22] Filed: Jan. 13, 1998

[51] Int. Cl.⁶ .................................................. H02G 3/04
[52] U.S. Cl. ............................... 174/48; 174/49; 174/50; 174/58; 174/60; 220/3.2; 220/3.8; 220/4.02
[58] Field of Search .................................. 174/48, 50, 58, 174/60, 67, 49; 220/3.2, 3.8, 4.02, 242, 3.3, 3.92, 3.94; 52/220.3, 220.7

[56] References Cited

U.S. PATENT DOCUMENTS

| | | |
|---|---|---|
| D. 292,396 | 10/1987 | Bramwell . |
| D. 294,689 | 3/1988 | Bramwell . |
| D. 305,530 | 1/1990 | Strand et al. . |
| D. 318,738 | 7/1991 | Clodfelter, Sr. . |
| D. 333,652 | 3/1993 | Feldman et al. . |
| 3,721,762 | 3/1973 | Gooding . |
| 3,769,445 | 10/1973 | Bregenzer . |
| 4,308,418 | 12/1981 | Van Kuik et al. ........................ 174/48 |
| 4,367,417 | 1/1983 | Cassanta . |
| 4,372,629 | 2/1983 | Propst et al. ......................... 312/223.6 |
| 4,618,741 | 10/1986 | Bramwell . |
| 4,747,506 | 5/1988 | Stuchlik, III ............................. 220/3.9 |
| 4,757,908 | 7/1988 | Medlin, Sr. ............................... 220/3.9 |
| 4,874,322 | 10/1989 | Dola et al. . |
| 4,899,018 | 2/1990 | Sireci ....................................... 174/48 |
| 4,952,163 | 8/1990 | Dola et al. . |
| 5,024,614 | 6/1991 | Dola et al. . |
| 5,086,194 | 2/1992 | Bruinsma . |
| 5,274,972 | 1/1994 | Hansen . |
| 5,336,849 | 8/1994 | Whitney . |
| 5,357,055 | 10/1994 | Sireci . |
| 5,486,650 | 1/1996 | Yetter . |
| 5,594,208 | 1/1997 | Cancellieri et al. . |
| 5,606,919 | 3/1997 | Fox et al. . |
| 5,614,695 | 3/1997 | Benito Navazo . |
| 5,804,763 | 9/1998 | Smeenge ................................. 174/48 |
| 5,861,576 | 1/1999 | Langston et al. ....................... 174/48 |

FOREIGN PATENT DOCUMENTS

| | | |
|---|---|---|
| 2 488 064 | 7/1980 | France . |
| 2 232 945 | 7/1972 | Germany . |
| 28 52 483 A1 | 12/1978 | Germany . |
| 44 38 446 A1 | 10/1994 | Germany . |
| 44 38 452 A1 | 10/1994 | Germany . |
| 1388275 | 3/1975 | United Kingdom ..................... 174/48 |
| 2 104 303 | 7/1981 | United Kingdom . |
| 2083957 | 3/1982 | United Kingdom ..................... 174/48 |
| 2 137 025 | 2/1984 | United Kingdom . |
| 2254966 | 10/1992 | United Kingdom ..................... 174/48 |
| 2275581 | 8/1994 | United Kingdom ..................... 174/48 |

*Primary Examiner*—Dean A. Reichard
*Assistant Examiner*—Dhiru R Patel
*Attorney, Agent, or Firm*—Mark D. Hilliard; Robert A. McCann; Michael J. Turgeon

[57] ABSTRACT

A modular raceway outlet station for use with a trunking duct which has a divider wall and a top access opening, includes an offset power box having a projection extending lateral from a top wall of the box having a top portion and an abutment portion which depends from the furthest extent of the top portion and is adapted to be substantially aligned with an edge of the top access opening, wherein the abutment portion does not project into the top access opening; and an opening formed in the abutment portion of the projection which communicates with an aperture formed in a side wall of the box adjacent the duct. The outlet station further includes, an extension which is adapted to extend over the top access opening having an abutment surface which aligns flush against the abutment portion of the projection; a routing notch formed in the abutment surface corresponding in longitudinal extent to the opening formed in the abutment portion of the projection; and a guide wall depending from the extension, interiorly adjacent the routing notch, having a longitudinal extent greater than the routing notch, and adapted to be substantially vertically aligned with the divider wall. Wherein, the power conductors may be routed out of and over the duct, and into the offset power box before installation of the extension and the power conductors remain completely isolated from the communication conductors after the extension is installed.

24 Claims, 9 Drawing Sheets

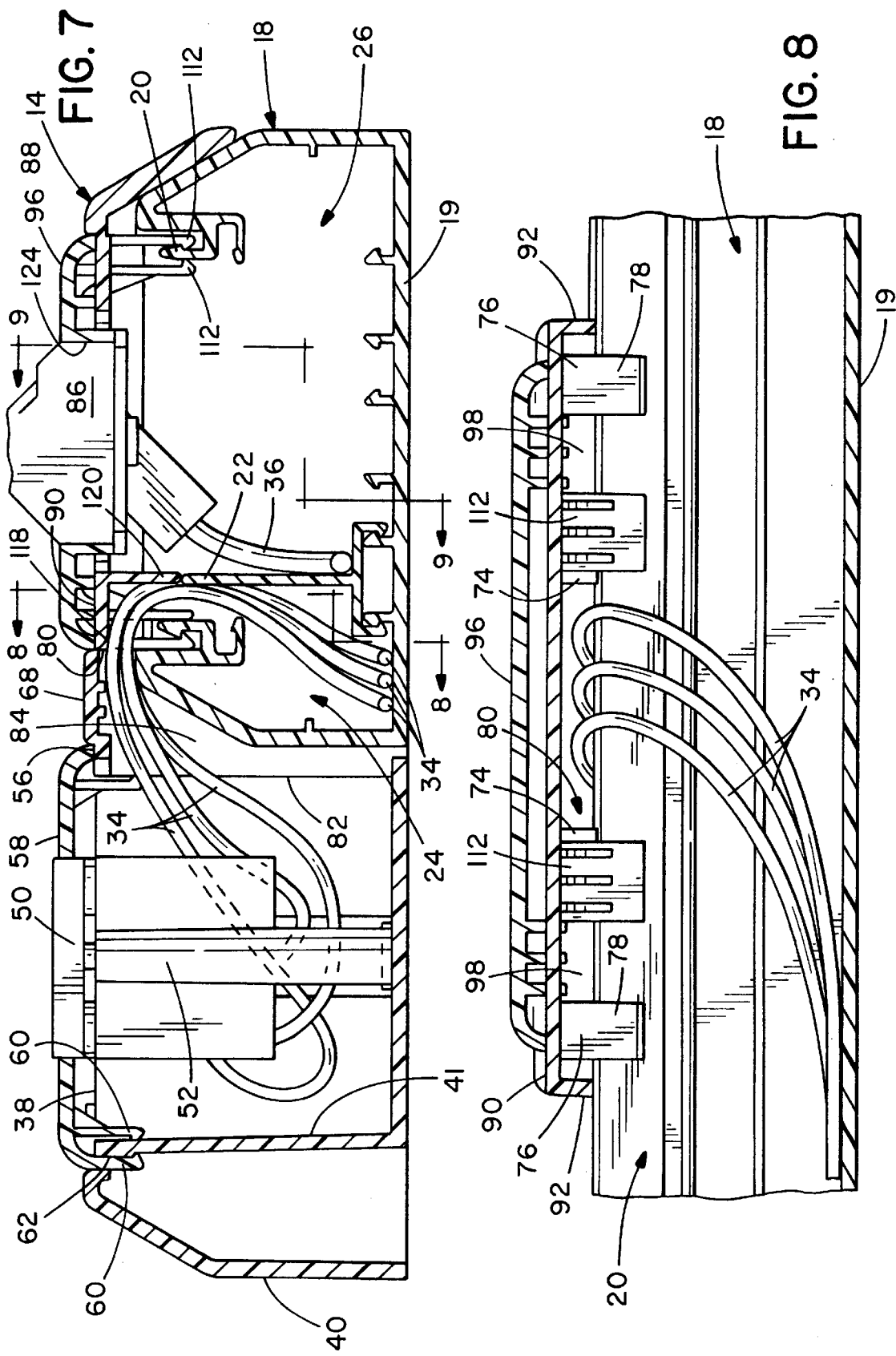

RACEWAY OUTLET STATION

TECHNICAL FIELD

The present invention relates to a multi-channel power and communication wiring raceway system, and more particularly to a modular offset power box and communication extension which allows the power conductors disposed in the raceway to be quickly and easily routed into the power box while keeping them isolated from the communication channel.

BACKGROUND OF THE INVENTION

Multi-channel wiring raceway systems have become common practice for installation of power and communication conductors within the same duct. These raceway systems are usually used in an office, commercial, or industrial setting where design, layout, production, seating arrangements, and equipment requirements are constantly changed or upgraded. Flexibility and adaptability in these constantly evolving environments makes the surface mount raceway system the preferred method over conductors installed within the walls of a building. However, when a change or modification is required, the power and/or communication outlets usually must be moved, rearranged or supplemented.

Previous wiring plans and raceway systems, by design, inhibit changes or modifications. In an office environment, each desk, cubicle or seating location requires not only power outlets but also communication outlets, and usually more than one of each. Computers, telephones, facsimile machines, modems, transcriber machines, printers, fans and typewriters are examples of some of the office equipment which requires a plurality of each type of outlet. To accommodate the connectivity needs of the many machines, often many power and communication outlets are positioned at each location. Thus, the ability within the raceway system design to place power and communication outlets where most needed, when required, is of utmost importance.

Previous designs have unsuccessfully addressed the problems and complications with a variety of proposed solutions, none of which increase the ease or speed of installation. Positioning the power outlet along a central axis of the raceway occupies a considerable amount of space in the communication channel, effectively reducing the total capacity thereof. Other designs which position the power outlet box offset from the raceway commonly use a base plate which forms the bottom of the power outlet box and extends laterally across the raceway, covering all of the channels thereof. A major disadvantage of this design includes the inability to safely, functionally connect the power outlet such that it may be sealed and operational while the other channels of the raceway remain easily accessible for routing of cables. Consequently, all other cables which are to be installed have to be fished through, underneath the base plate covering the raceway, or cut and spliced at the junction, rather than being simply laid in the proper channel. This problem is often enhanced when two different installers are required for the power and communication connections.

Other disadvantages include increased time and difficulty of installation, cumbersome to maneuver cables and equipment around the base plate, no electrical power available until the electrical installer and communications installer have completed their jobs, and power conductors not isolated from communication conductors until installation is completed.

Therefore, in the design of raceway systems, more economical, easier to install outlet stations are desired, and improvement in the art of raceway modular power and communication outlets is needed.

SUMMARY OF THE INVENTION

It is therefore an object of the present invention to provide an improved raceway outlet station.

It is a further object of the present invention to provide a two-part raceway outlet station having modular power and communication outlet facilities.

It is another further object of the present invention to provide an integral raceway outlet station having power and communication outlet facilities.

It is another further object of the present invention to provide independently installable power outlet and communication outlet facilities.

It is another further object of the present invention to provide a power box offset from the raceway which may be functionally connected, sealed and operational before installation of any communication service.

It is another further object of the present invention to provide a communication extension which facilitates mounting communication outlets over the communication channels and isolates the power wires routed over the raceway wall from the communication cables.

In general, a modular raceway outlet station for use with a trunking duct which has a divider wall and a top access opening, includes an offset power box having a projection extending lateral from a top wall of the box having a top portion and an abutment portion which depends from the furthest extent of the top portion and is adapted to be substantially aligned with an adjacent edge of the top access opening, wherein the abutment portion does not project into the top access opening; and an opening formed in the abutment portion of the projection which is in communication with an aperture formed in a side wall of the box adjacent the duct. The outlet station further includes, a communication extension which is adapted to extend over the top access opening having an abutment surface which aligns flush against the abutment portion of the projection; a routing notch formed in the abutment surface corresponding in longitudinal extent to the opening formed in the abutment portion of the projection; and a guide wall depending from the extension, interiorly adjacent the routing notch, having a longitudinal extent greater than the routing notch, and adapted to be substantially vertically aligned with the divider wall. Wherein, the power conductors may be routed out of and over the duct, and into the offset power box before installation of the extension and the power conductors remain completely isolated from the communication conductors after the extension is installed.

BRIEF DESCRIPTION OF THE DRAWINGS

FIG. 7 is a transverse cross-sectional view of the raceway outlet station and raceway system of FIG. 6 taken along section line 7—7;

FIG. 8 is a cross-sectional view of the raceway outlet station and raceway system of FIG. 7 taken along section line 8—8;

DESCRIPTION OF THE PREFERRED EMBODIMENT

Figure 1:
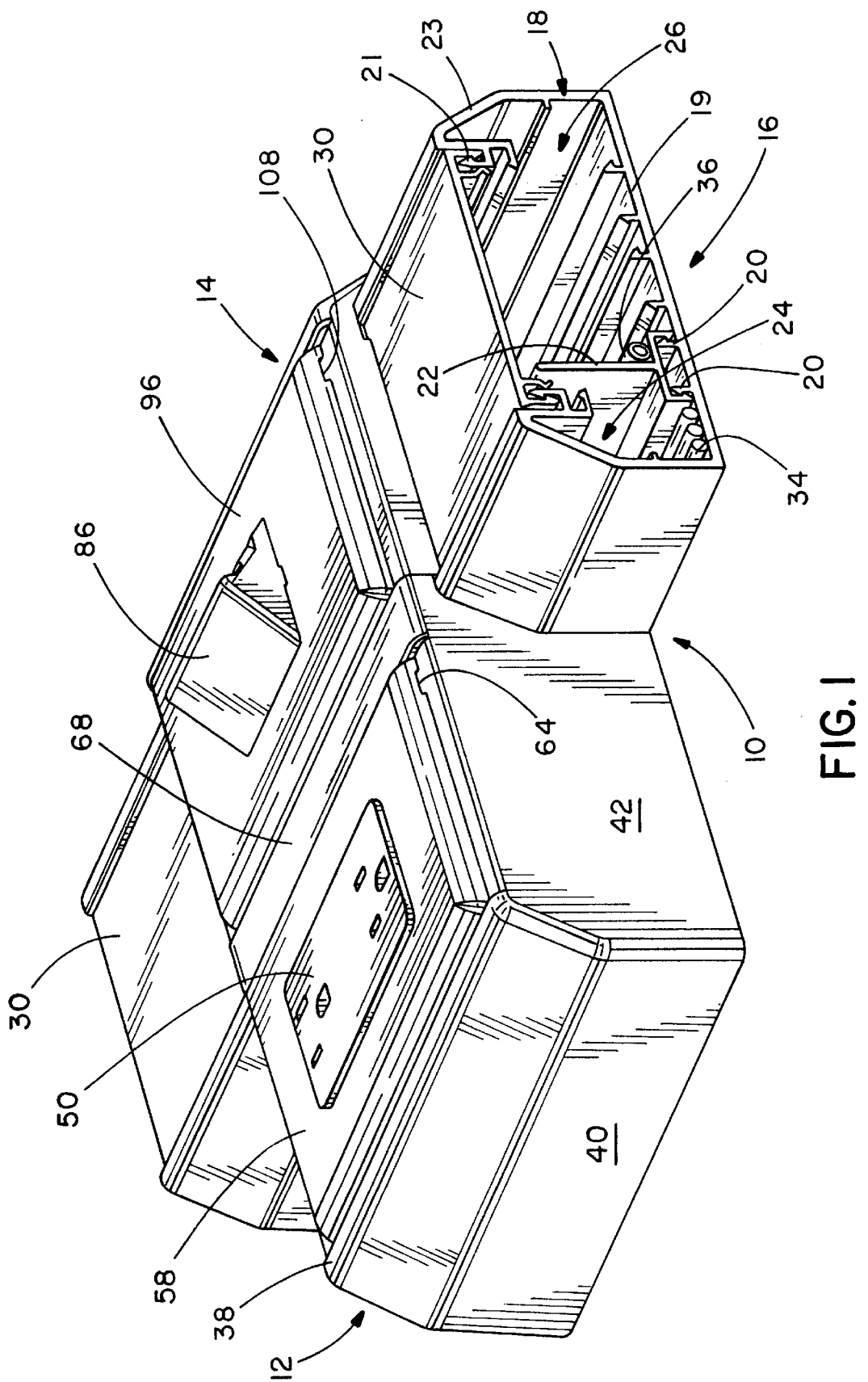
FIG. 1 is a perspective view of the raceway outlet station completely assembled and as used with a raceway system.

A raceway outlet station embodying the concept of the present invention is designated generally by the reference numeral 10 in the accompanying drawings. As shown in FIGS. 1–5, the raceway outlet station 10 is generally comprised of an offset power box 12 and a communication extension 14, which cooperate with a wiring raceway system 16 to expand the capabilities thereof. The raceway system 16 is comprised of a trunking duct 18, which has a plurality of latching elements 20 disposed on the duct base 19, a divider wall 22, which separates the duct 18 into a power channel 24 and a communication channel 26, a duct top access opening 28 with associated latching elements 21, duct side walls 23, and duct cover 30, which has a pair of laterally displaced latching elements 32 that cooperate with the access opening latching elements 21 to retain the duct cover 30 thereon. Power conductors 34 are disposed in a smaller power channel 24, which is shown to the left of the divider wall 22 in FIGS. 1, 2 and 7. Preferably, the offset power box 12 is mounted adjacent the power channel 24. Communication conductors 36, of which there are commonly more, are placed in the larger communication channel 26, which is shown to the right of the divider wall 22 in FIGS. 1, 2 and 7. Preferably, the extension receiving aperture 122 is in communication with the channel 26 when the extension 14 is installed.

Figure 3:
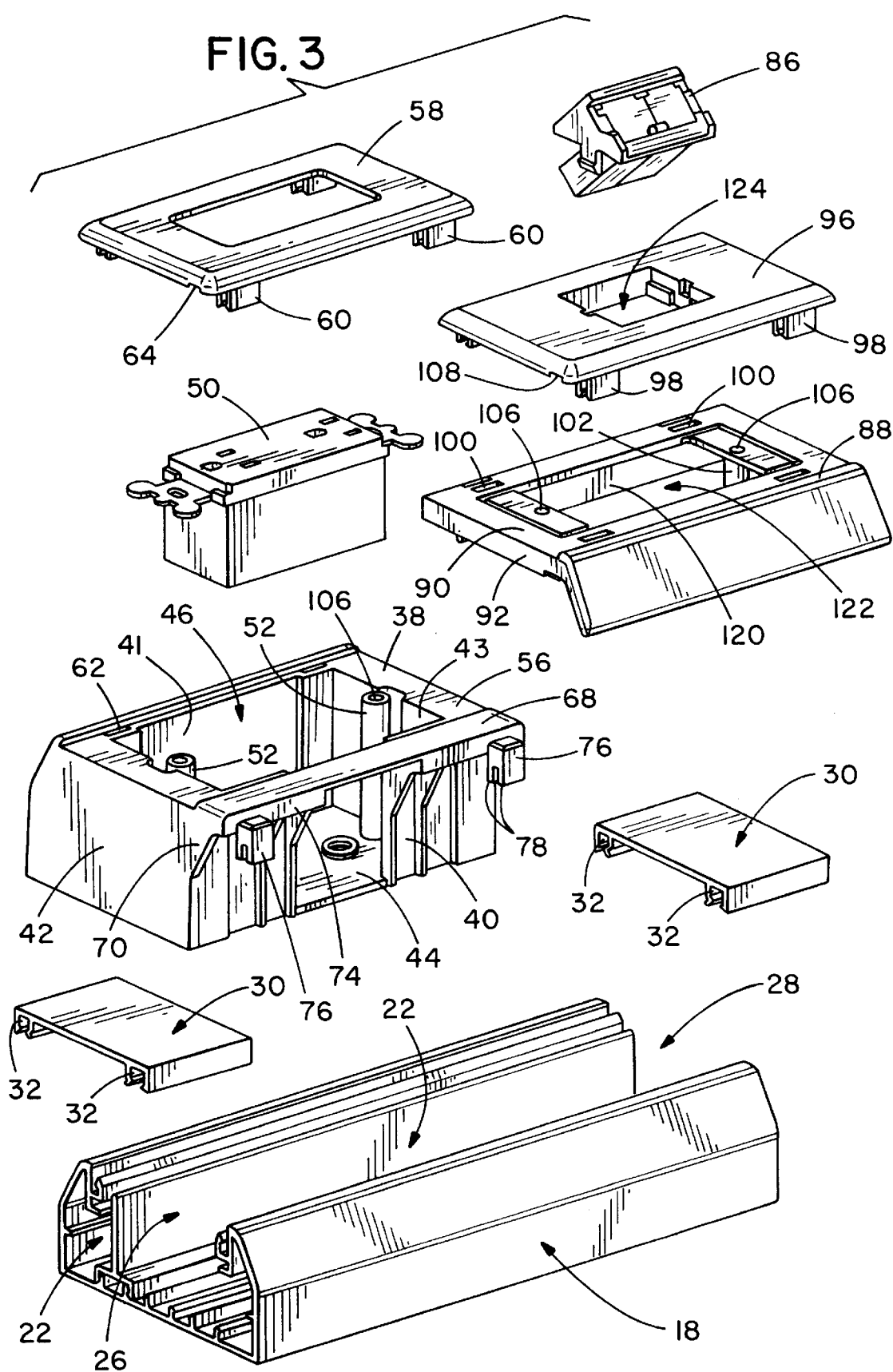
FIG. 3 is an exploded view of the raceway outlet station of FIG. 1, as used with a raceway system.
Figure 4:
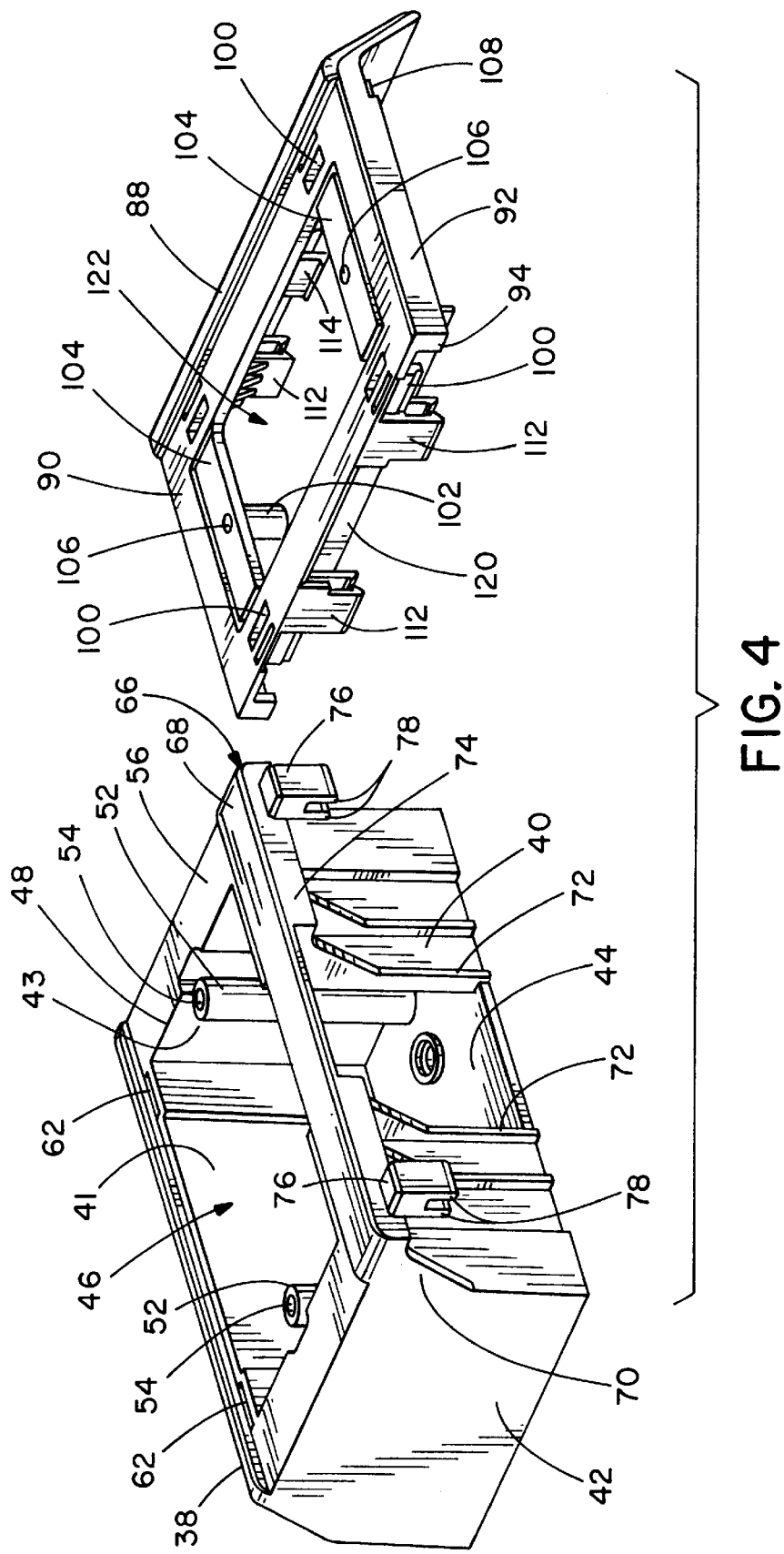
FIG. 4 is a top exploded view of the raceway outlet station of FIG. 1.
Figure 5:
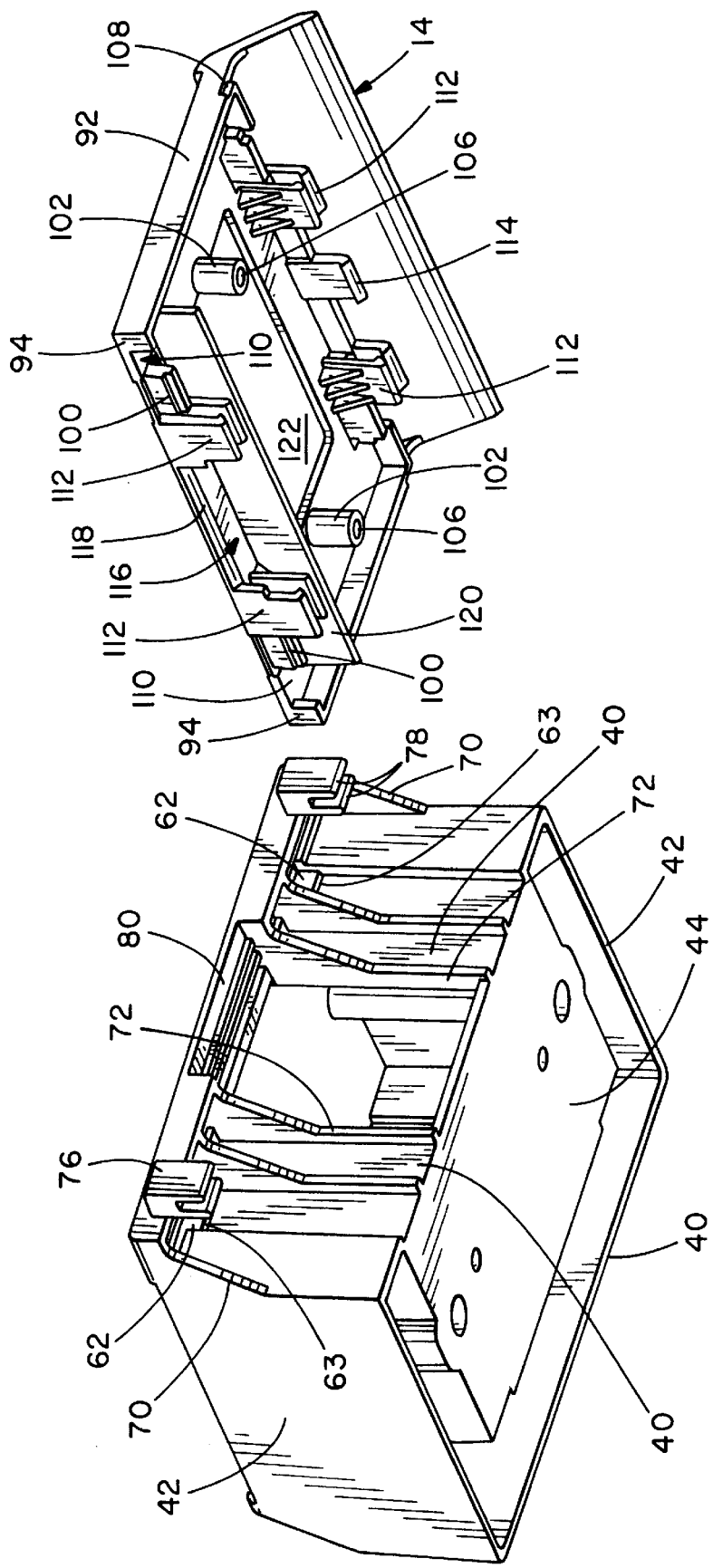
FIG. 5 is a bottom exploded view of the raceway outlet station of FIG. 1.
Figure 6:
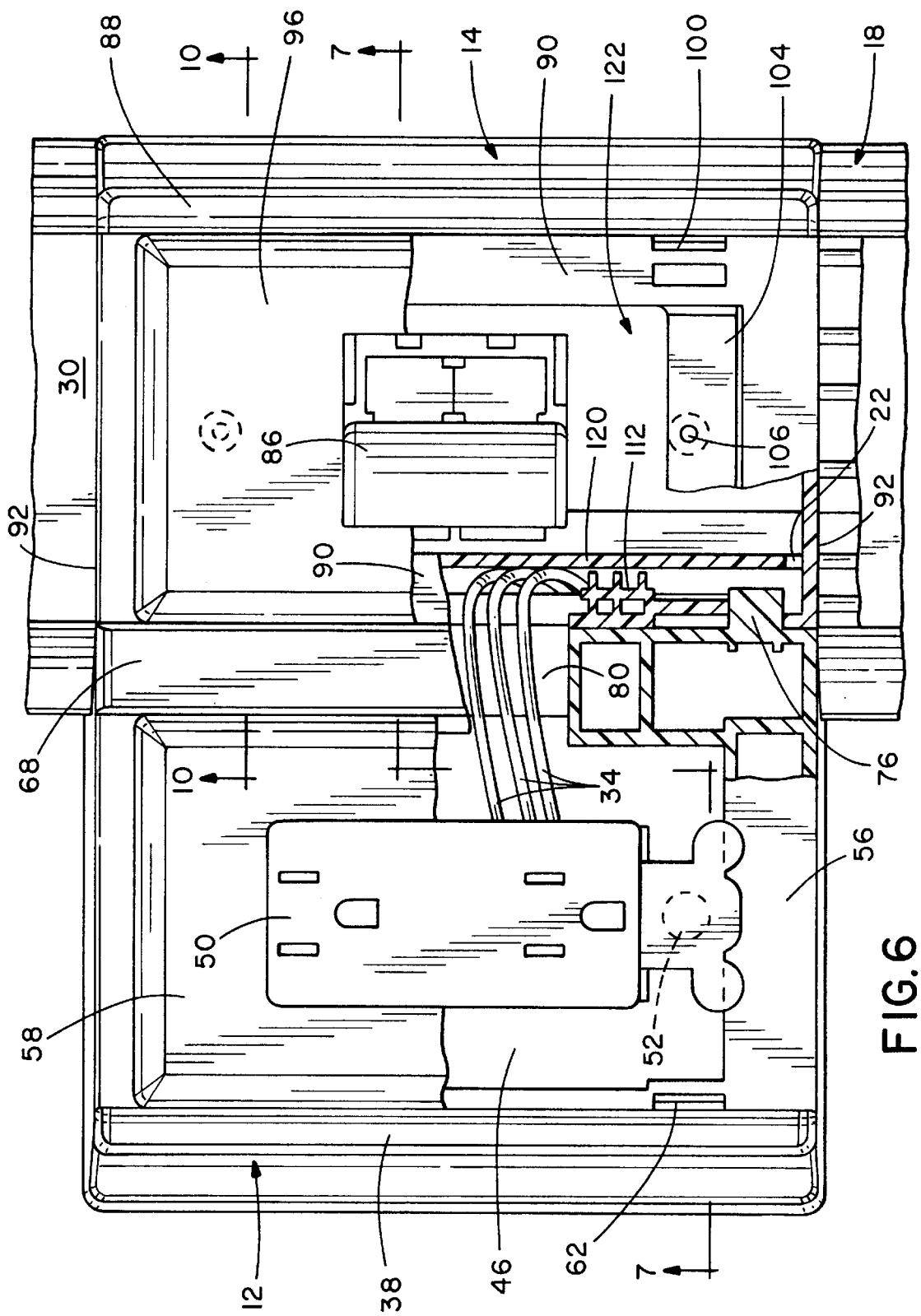
FIG. 6 is a partially broken away top view of the raceway outlet station of FIG. 1, as used with a raceway system, showing the power wires routed into the power box.

The offset power box 12, as shown in FIGS. 4 and 5, preferably represents a rectangular box-like structure, which is generally similar to a conventional surface mount power receptacle box. The power box 12 has a top wall 38, a pair of sidewalls 40, a pair of end walls 42, and a bottom wall 44. A receiving area 46 is generally defined within the interior of the box by an opening 48 in the top wall 38, a pair of interior end walls 43, an interior sidewall 41 opposite the duct 18, another side wall 40 in common with the box 12 adjacent the duct 18, and a bottom wall 44 in common with the box 12. The receiving area 46 preferably accommodates and facilitates the installation of a single gang duplex power receptacle 50, a conventional GFCI model is shown in FIGS. 3, 6 and 7. Communication outlets of various styles may also be mounted in the receiving area 46, if so desired. Mounting bosses 52 are provided therein, which engage the fasteners (not shown) to positively retain the receptacle 50 within the box 12. Disposed on the bottom wall 44 of the box 12 are mounting apertures 54 which enable the box to be positively secured to a mounting surface (not shown) with fasteners (not shown), such as screws, as the primary means of positioning the box 12. A secondary means will be described below.

Figure 10:
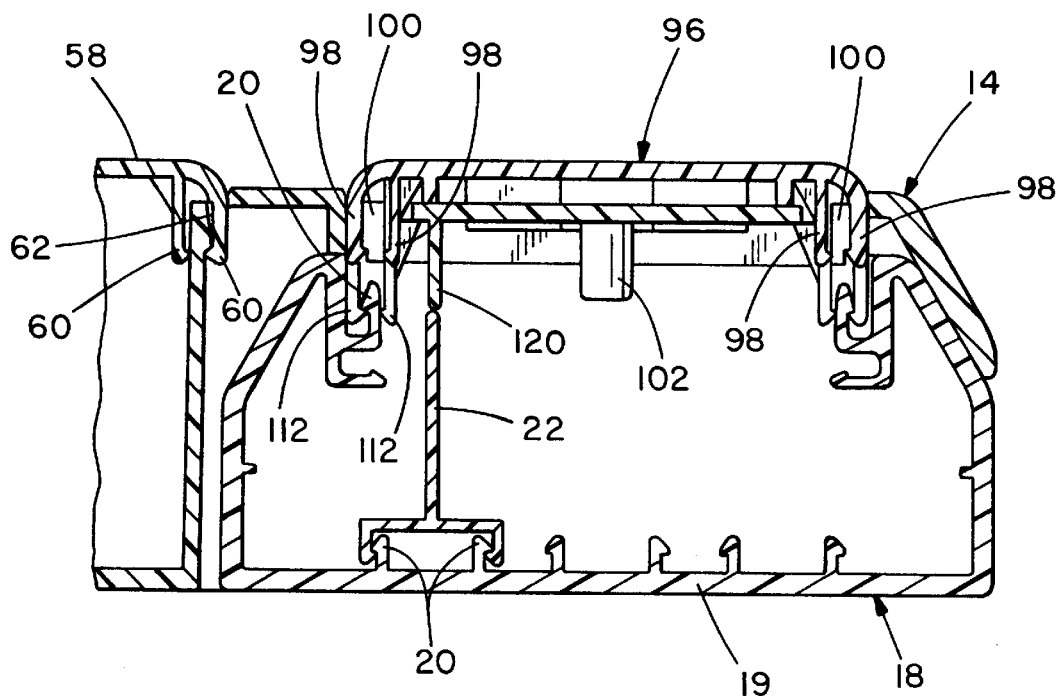
FIG. 10 is a broken away transverse cross-sectional view of the raceway outlet station and raceway system of FIG. 6 taken along section line 10—10.

The top wall 38 of the box 12 has a longitudinally defined recessed portion 56 so configured to receive a faceplate 58 of conventional dimensions, a GFCI receptacle faceplate is shown. A common power or communication screw-mounted faceplate (not shown) can be accommodated, or a snap-in faceplate 58, shown in FIGS. 1–3 and 7, which has integral latching elements 60 depending therefrom to engage the cored-out latching elements 62 disposed adjacent corners of the recessed portion 56. Latching elements 60 each have a pair of equivalent length depending members configured as arrowheads with the exterior portions removed at the furthest extent thereof. The opposing half arrowheads bias each other into engagement with the latching elements 62 which feature a cored-out latch geometry, as best shown in FIGS. 5, 7 and 10 as a ledge 63 resulting from a decrease in cross-section of the box side wall 40. Cooperation of these two latching elements 60 and 62 provides extremely positive retention of the faceplate 58. Pry slots 64 are provided at selected corners of the faceplate 58 to assist removal of faceplate 58 from power box 12.

As shown in FIGS. 3–5, the box 12 has a projection 66 which laterally extends from the box 12 toward the trunking duct 18. Formed primarily by extensions of the top wall 38 and side walls 40, the projection 66 has a top portion 68, end flanges 70, interior flanges 72, and an abutment portion 74. The end and interior flanges 70 and 72 are preferably contoured to provide a flush fit when the box 12 is properly positioned immediately adjacent the duct 18. The abutment portion 74 vertically depends from the furthest lateral extent of the top portion 68 such that it is substantially vertically aligned with the adjacent edge 29 of the duct top access opening 28. When so positioned, no part of the abutment portion 74 projects into the top access opening 28 and the duct covers 30 may be installed without interference from the projection 66. The top portion 68 helps retain power conductors 34 when routed over the duct side wall 23. Additionally, alignment bosses 76 may extend and depend from the abutment portion 74. These generally block-shaped features may also have latching elements 78 formed therein, which are positioned to engage the access opening latching elements 21 and provide an additional secondary securing means for the offset power box 12. The alignment bosses 76 further provide a form of stopping means or positioning mechanism for the duct covers 30, as will be described below.

An opening 80 is formed in the abutment portion 74 and preferably extends between two adjacent interior flanges 72. The longitudinal extent of the opening, however, may be as large as the distance between the two alignment bosses 76 depending on the application. The box side wall 40 also has an aperture 82 formed therein, preferably extending longitudinally between the same two adjacent interior flanges 72. Again, the longitudinal extent of the aperture 82 may be as large as the distance between the two alignment bosses 76 depending on the application. Whatever the longitudinal extent of the opening 80 and aperture 82, they are joined by a passage 84 which is bounded by the same two adjacent interior flanges 72, the exterior of the duct 18, and a bottom surface of the top portion 68. This passage 84 enables an installer to affix the box 12 into proper position and safely route the power conductors 34 out of the power channel 24, over the top of the duct side wall 23, and into the box receiving area 46 so that the power receptacle 50 may be functionally connected thereto as shown in FIGS. 2 and 6–8. The box faceplate 58 may then be installed and the outlet safely operational without interfering with the installation of any communication conductors 36.

Figure 9:
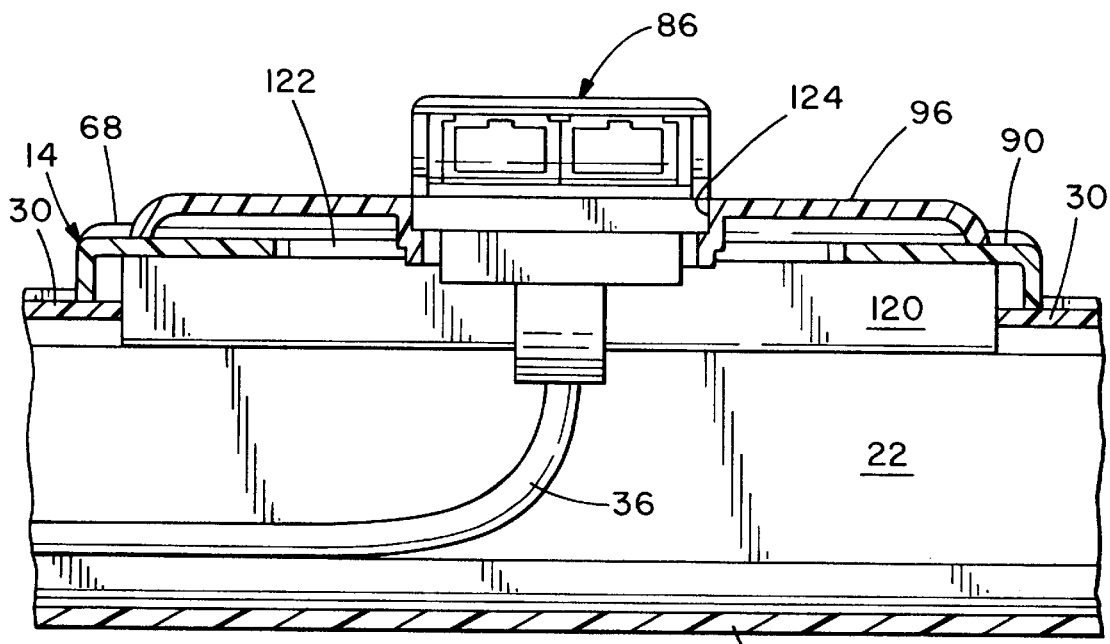
FIG. 9 is a cross-sectional view of the raceway outlet station and raceway system of FIG. 7 taken along section line 9—9.
Figure 11:
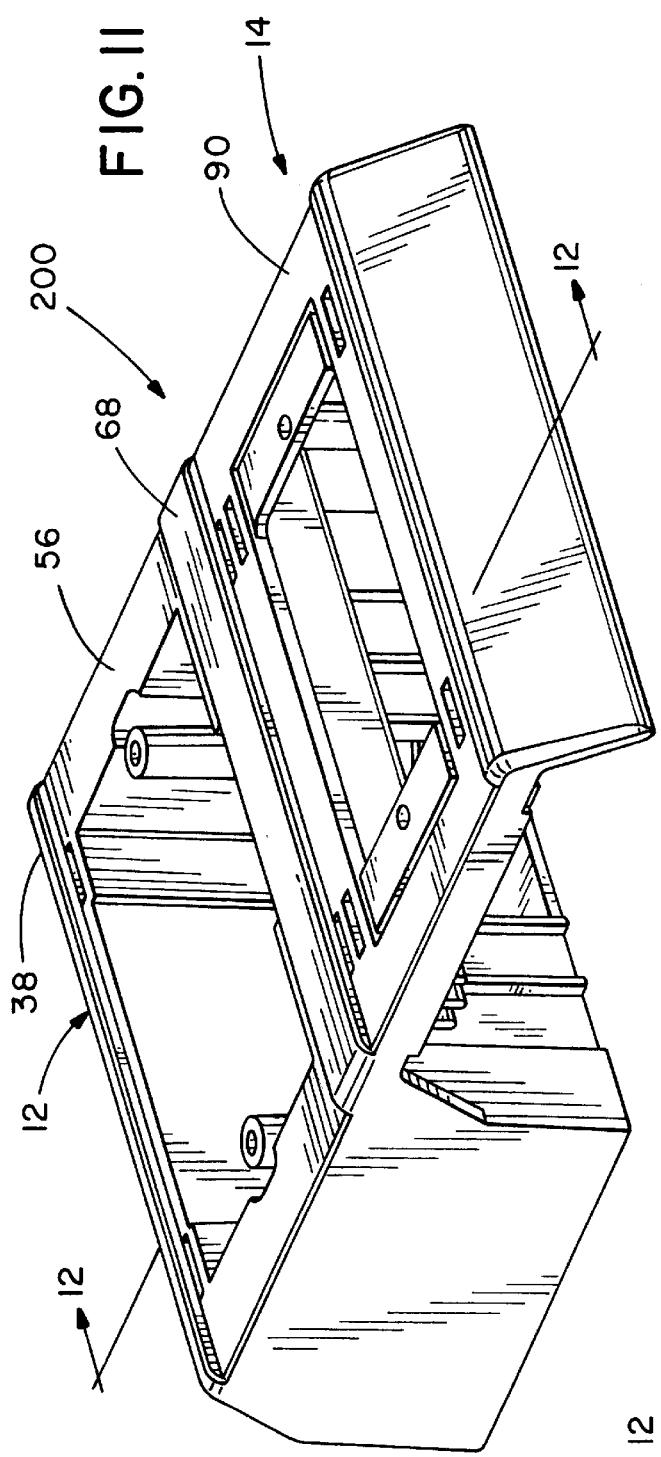
FIG. 11 is a perspective view of an alternative form of the raceway outlet station of FIG. 1.
Figure 12:
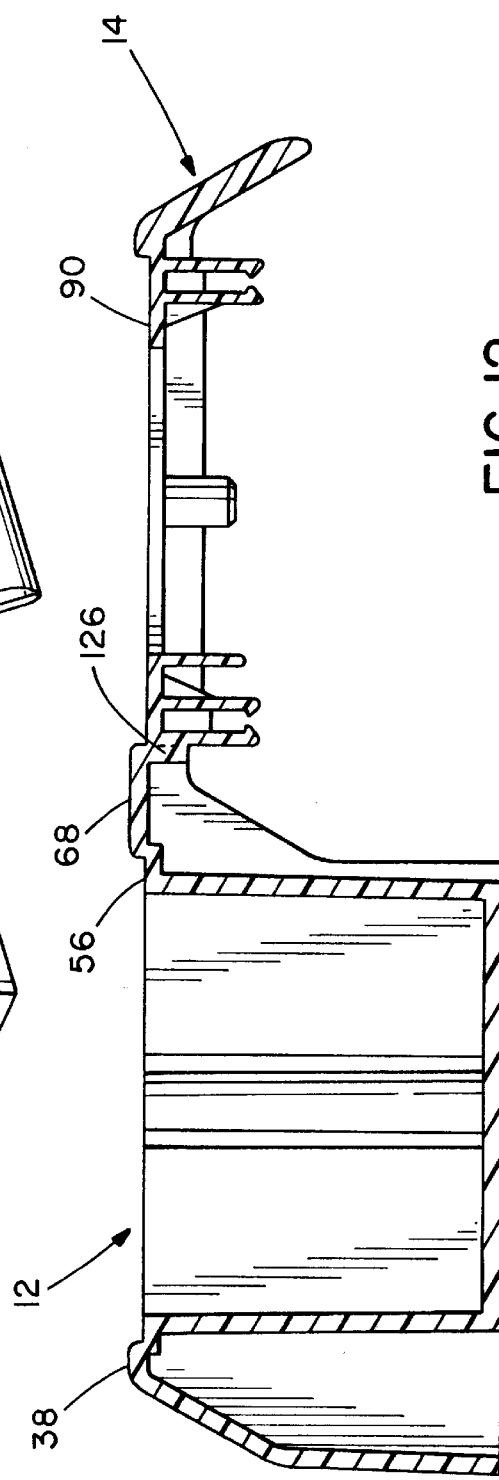
FIG. 12 is a transverse cross-sectional view of the alternative form of the raceway outlet station of FIG. 11 taken along section line 12—12.

The communication extension 14 is preferably the second piece of the raceway outlet station 10 which is aligned with the offset power box 12, when finally positioned, and appears to be a lateral projection thereof. Alternatively, the modular two-piece design could be formed as an integral unit 200, as shown in FIGS. 11 and 12, having all of the same features as detailed below, except an integral abutment wall 126 generally is comprised of the abutment portion 74 and the abutment surface 94. In position, the extension 14 conforms to the exterior contours of the raceway system 16 and facilitates the installation of a communication outlet 86, such as a single gang sloped insert shown in FIGS. 1, 3, 6 and 7. The extension 14 has a top surface 88, which has a longitudinally defined recessed surface 90, a pair of end surfaces 92, a receiving aperture 122 and an abutment surface 94. Much like the recessed portion 56 of the box 12, the extension recessed surface 90 is for positioning an extension faceplate 96, which is dimensionally equivalent to the box faceplate 58 and other commonly available communication faceplates. The extension faceplate 96 also has integral latching elements 98, similar to those described above, which engage cored-out latching elements 100 disposed below the top surface 88 of extension 14 and having the same geometry as the box cored-out latching elements 62. Preferably, an aperture 124 is disposed on the faceplate 96 to receive a communication outlet 86, while maintaining the required minimum one inch bend radius, as shown in FIGS. 7 and 9.

Mounting bosses 102 depend from a groove-defined knockout section 104 of the extension 14 to provide support for apertures 106 to which common communication faceplates (not shown) may be attached by conventional fasteners (not shown) such as screws. The end surfaces 92 depend from the top surface 88 a certain amount which provides a flush, overlapping fit with the duct covers 30 and the exterior of the duct 18. Pry slots 108 are formed in the end surfaces 92 opposite the power box 12 to assist in removal of the extension 14, when required.

The abutment surface 94 depends from the longitudinal edge of the top surface 88 adjacent the box 12, and, when finally positioned, aligns flush against the abutment portion 74 of the projection 66. Alignment notches 110 are formed in the abutment surface 94 and disposed in a position spaced longitudinally exterior each extension faceplate cored-out latching element 100 adjacent the power box 12. The alignment bosses 76 are received or captured within the nearly equivalently dimensioned alignment notches 110 to precisely position the extension 14 in relation to the power box 12. Additionally disposed on the abutment surface 94 are one of the two pairs of extension latching elements 112, which depend from the extension 14 and incorporate a geometry similar to that of the faceplates described above. The latching elements 112 are disposed longitudinally interior of each of the extension faceplate cored-out latch elements 100, and at positions laterally disposed therefrom. Access opening latching elements 21 are substantially aligned to cooperate with all of the extension latching is elements 112 for positive retention of the extension 14 to the duct 18. An additional latching element 114 is disposed in longitudinal alignment with the pair of latching elements 112 opposite the power box 12 for increased holding power.

A routing notch 116 is formed in the abutment surface 94 between the longitudinally spaced extension latching elements 112 adjacent the power box 12, and preferably corresponding in longitudinal extent to the opening 80 formed in the abutment portion 74 of the power box 12. A slight bevel 118 further defines the routing notch 116 and provides increased clearance for routing the power conductors 34. Additionally, a guide wall 120 depends from the extension 14 interiorly adjacent the routing notch 116. The edge of the extension receiving aperture 122 adjacent the power box 12 is further defined thereby. Further, the guide wall 120 substantially aligns with the divider wall 22 of the raceway system 16, thereby keeping the power conductors 34 completely isolated from the communication conductors 36 as per EIA/TIA standards. Preferably, the longitudinal extent of the guide wall 120 is equivalent to the longitudinal spacing between the exterior edges of the alignment notches 110, however a lesser extent may be permissible in certain circumstances.

In order to assemble, as shown in FIG. 3, an installer first positions the trunking duct 18 in the preselected location and affixes accordingly. Then, at the predetermined locations for the power and communication outlets, the offset power box 12 is snap-fitted immediately adjacent to the duct 18 by depressing alignment latching elements 78 onto the access opening latching elements 21. Fasteners (not shown) may then be used to secure the box 12 to the mounting surface through the mounting apertures 54. With the power box 12 properly situated, the divider wall 22, if not formed as integral with the duct 18, is installed by engaging the duct latching elements 20. The power conductors 34 may then be laid into position in the power channel 24 through the top access opening 28.

Operatively connecting the power conductors 34 to the power receptacle 50 can now be achieved. In order to accomplish this task, the power conductors 34 must be routed out of the power channel 24 and top access opening 28, over the duct sidewall 23, through the opening 80, passage 84 and aperture 82, and into the receiving area 46, as shown in FIGS. 2 and 6–8. Then the power receptacle 50 may be connected to the power conductors 34 and secured to the mounting bosses 52. The box faceplate 58 is preferably snapped into position, or fastened by other means, thus sealing the power box 12. Consequently, this offset power box 12 may now be used as it is operational.

Figure 2:
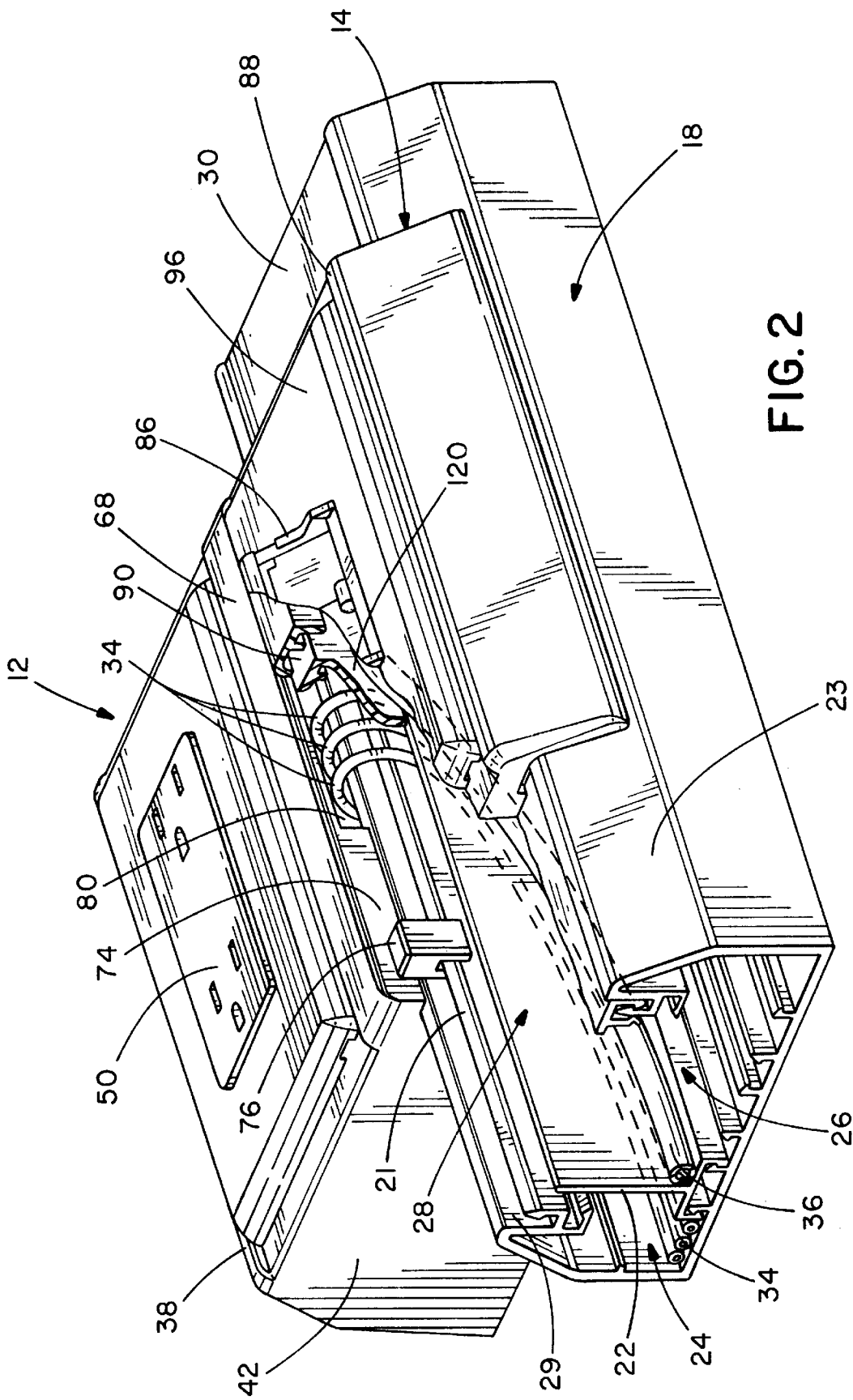
FIG. 2 is a partially broken away perspective view of the raceway outlet station of FIG. 1 as used with a raceway system, showing the power wires routed into the power box.

When communication outlets are to be additionally installed, the extension 14 must be used. First the communication conductors 36 are laid in the communication channel 26 through the top access opening 28. After the proper conductors have been selected, the extension 14 may be installed. This is accomplished by positioning the alignment notches 110 over the alignment bosses 76, and depressing the extension such that latching elements 112 and 114 positively engage the access opening latching elements 21, as shown in FIGS. 2 and 6. The routing notch 116 and bevel 118 prevent the abutment surface 94 from interfering with or impinging upon the power conductors 34 routed into the box. Additionally, the guide wall 120 substantially aligns with the divider wall 22 to completely isolate the communication channel 26 from the power conductors 24, as shown in FIGS. 7, 9 and 10.

Through the receiving aperture 122 the installer may select the proper communication conductors 36 to be terminated at a communication outlet 86. Once completed, the desired communication outlets are fastened to a faceplate 96 which preferably snaps into engagement with the extension 14, as shown in FIGS. 6–10 or is affixed by common fasteners to mounting bosses 102. Knock-out sections 104 may be removed to provide additional access for communication outlets or other requirements. The duct covers 30 are preferably snapped onto the duct 18 and slid under the extension 14 until stopping flush against the alignment bosses 76, as shown in FIG. 9. The extension 14 overlaps the duct covers 30 giving a clean aesthetic appearance.

Generally, the same assembly procedure is followed when the integrally-formed station 200 is selected, of course, allowing for the one-piece construction.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A modular raceway outlet station for use with a trunking duct which has a divider wall and a top access opening comprising:
    an offset power box having,
        a projection extending laterally from a top wall of the offset power box having a top portion and an abutment portion depending from a furthest extent of the top portion adapted to be disposed substantially aligned with an adjacent edge of the top access opening; and
        an opening formed in the abutment portion of the projection is in communication with an aperture formed in a side wall of the offset power box adjacent the duct; and
    a communication extension adapted to be disposed over the duct top access opening having,
        an abutment surface depending from a top surface of the extension adapted to be disposed flush against the abutment portion of the projection;
        a routing notch formed in the abutment surface and
        a guide wall depending from the extension interiorly adjacent the routing notch, adapted to be substantially vertically aligned with a divider wall,
    wherein power conductors may be routed out of and over the duct, through the routing notch, and opening, and into the offset power box before installation of the extension, such that the power conductors are isolated from communication conductors when the extension is installed.

2. A modular raceway outlet station according to claim 1, further having alignment bosses which extend and depend from the abutment portion and have disposed thereon means for latching which are adapted to be operatively associated with the duct, wherein the alignment bosses are further adapted to provide a positioning stop for a duct cover.

3. A modular raceway outlet station according to claim 2 further having extension latching element which depend from the extension and are adapted to be operatively associated with the duct, and means for latching a faceplate to the top surface of the extension disposed spaced longitudinally exterior each extension latching element.

4. A modular raceway outlet station according to claim 3, further having alignment notches formed in the abutment surface, disposed longitudinally exterior each means for latching said faceplate adjacent the offset power box, which are operatively associated with the alignment bosses to align box end walls and extension end surfaces.

5. A modular raceway outlet station according to claim 3, wherein the means for latching said faceplate comprises cored-out latching elements disposed adjacent each corner of the extension.

6. A modular raceway outlet station according to claim 3, wherein the means for latching said faceplate comprises apertures disposed on the top surface of the extension and depending mounting bosses disposed under each of said apertures.

7. A modular raceway outlet station according to claim 1, further having means for latching a faceplate to the top wall of the offset power box.

8. A modular raceway outlet station according to claim 1, wherein the offset power box and the extension are separate, non-integral elements.

9. An integrally formed raceway outlet station for use with a trunking duct which has a divider wall, comprising:
    an offset power box having, a projection extending laterally from a top wall of the box;
    a communication extension adapted to be disposed over the duct top access opening having, a guide wall depending from the extension adapted to be substantially vertically aligned with a divider wall; and
    an abutment portion disposed between the offset box projection and the extension, depending in part from each, having a routing notch formed laterally therethrough in communication with an aperture formed in a sidewall of the box adjacent the trunking duct,
    wherein the power conductors may be routed out of and over the duct, through the routing notch, and into the offset power box such that the power conductors are isolated from communication conductors.

10. A modular raceway outlet station according to claim 9, further having aligned bosses which extend and depend from the abutment portion and have disposed thereon means for latching which are adapted to be operatively associated with the trunking duct, wherein the alignment bosses are further adapted to provide a positioning stop for a duct cover.

11. A modular raceway outlet station according to claim 10 further having extension latching element which depend from the extension and are adapted to be operatively associated with the trunking duct, and means for latching a faceplate to a top surface of the extension disposed spaced longitudinally exterior each extension latching element.

12. A modular raceway outlet station according to claim 11, further having alignment notches formed in the abutment surface, disposed longitudinally exterior each means for latching said faceplate adjacent the offset power box, which are operatively associated with the alignment bosses to align box end walls and extension end surfaces.

13. A modular raceway outlet station according to claim 11, wherein the means for latching said faceplate comprises cored-out latching elements disposed adjacent each corner of the extension.

14. A modular raceway outlet station according to claim 11, wherein the means for latching said faceplate comprises apertures disposed on the top surface of the extension and depending mounting bosses disposed under each of said apertures.

15. A modular raceway outlet station according to claim 9, further having means for latching a faceplate to the top wall of the offset power box.

16. A modular raceway outlet station according to claim 9, wherein the offset power box and the extension are separate, non-integral elements.

17. A modular raceway outlet station for use with a trunking duct which has a divider wall and a top access opening comprising:
    an offset power box having,
        a projection extending laterally from a top wall of the box having a top portion and an abutment portion depending from a furthest extent of the top portion adapted to be disposed substantially aligned with an adjacent edge of the top access opening; and an opening formed in the abutment portion of the projection in communication with a aperture formed in a side wall of the box adjacent the trunking duct; and a communication extension adapted to project over the duct top access opening having, an abutment surface depending from a top surface of the extension adapted to be disposed flush against the abutment portion of the projection;

a routing notch formed in the abutment surface corresponding in longitudinal extent to the opening formed in the abutment portion of the projection; and a guide wall depending from the extension interiorly adjacent the routing notch, adapted to be substantially vertically aligned with a divider wall and having a longitudinal extent greater than the routing notch, wherein power conductors may be routed out of and over the duct, through the routing notch, and opening, and into the offset power box before installation of the extension, such that the power conductors are isolated from the communication conductors when the extension is installed.

18. A modular raceway outlet station according to claim 17, further having alignment bosses which extend and depend from the abutment portion and have disposed thereon means for latching which are adapted to be operatively associated with the trunking duct, wherein the alignment bosses are further adapted to provide a positioning stop for a duct cover.

19. A modular raceway outlet station according to claim 18 further having extension latching element which depend from the extension and are adapted to be operatively associated with the trunking duct, and means for latching a faceplate to the top surface of the extension disposed spaced longitudinally exterior each extension latching element.

20. A modular raceway outlet station according to claim 19, further having alignment notches formed in the abutment surface, disposed longitudinally exterior each means for latching a faceplate adjacent the offset power box, which are operatively associated with the alignment bosses to align box end walls and extension end surfaces.

21. A modular raceway outlet station according to claim 19, wherein the means for latching said faceplate comprises cored-out latching elements disposed adjacent each corner of the extension.

22. A modular raceway outlet station according to claim 19, wherein the means for latching said faceplate comprises apertures disposed on the top surface of the extension and depending mounting bosses disposed under each aperture.

23. A modular raceway outlet station according to claim 17, further having means for latching said faceplate to the top wall of the offset power box.

24. A modular raceway outlet station according to claim 17, wherein the offset power box and the extension are separate, non-integral elements.

* * * * *

(12) EX PARTE REEXAMINATION CERTIFICATE (5091st)
United States Patent
Caveney et al.

(10) Number: US 5,998,732 C1
(45) Certificate Issued: Mar. 29, 2005

(54) RACEWAY OUTLET STATION

(75) Inventors: Jack E. Caveney, Hinsdale, IL (US);
Randall T. Woods, Bartlett, IL (US);
Charles VanderVelde, Frankfort, IL (US)

(73) Assignee: Panduit Corp., Tinley Park, IL (US)

Reexamination Request:
No. 90/006,930, Feb. 9, 2004

Reexamination Certificate for:
| | |
|---|---|
| Patent No.: | 5,998,732 |
| Issued: | Dec. 7, 1999 |
| Appl. No.: | 09/006,663 |
| Filed: | Jan. 13, 1998 |

(51) Int. Cl.[7] .............................................. H02G 3/04
(52) U.S. Cl. .......................... 174/48; 174/49; 174/50; 174/58; 174/60; 220/3.2; 220/3.8; 220/4.02
(58) Field of Search .............................. 174/48, 49, 50, 174/58, 60, 67; 220/3.2, 3.3, 3.8, 3.92, 3.94, 4.02, 242; 52/220.1, 220.3, 220.5, 220.7

(56) References Cited

U.S. PATENT DOCUMENTS

| | | |
|---|---|---|
| 4,323,723 A | 4/1982 | Fork et al. |
| 5,861,576 A | 1/1999 | Langston et al. |

FOREIGN PATENT DOCUMENTS

| | | |
|---|---|---|
| DE | G 94 17 099.1 | 3/1995 |
| EP | 0 241 325 | 10/1987 |

*Primary Examiner*—Dean A. Reichard
(74) *Attorney, Agent, or Firm*—Oliff & Berridge, PLC

(57) ABSTRACT

A modular raceway outlet station for use with a trunking duct which has a divider wall and a top access opening, includes an offset power box having a projection extending lateral from a top wall of the box having a top portion and an abutment portion which depends from the furthest extent of the top portion and is adapted to be substantially aligned with an edge of the top access opening, wherein the abutment portion does not project into the top access opening; and an opening formed in the abutment portion of the projection which communicates with an aperture formed in a side wall of the box adjacent the duct. The outlet station further includes, an extension which is adapted to extend over the top access opening having an abutment surface which aligns flush against the abutment portion of the projection; a routing notch formed in the abutment surface corresponding in longitudinal extent to the opening formed in the abutment portion of the projection; and a guide wall depending from the extension, interiorly adjacent the routing notch, having a longitudinal extent greater than the routing notch, and adapted to be substantially vertically aligned with the divider wall. Wherein, the power conductors may be routed out of and over the duct, and into the offset power box before installation of the extension and the power conductors remain completely isolated from the communication conductors after the extension is installed.

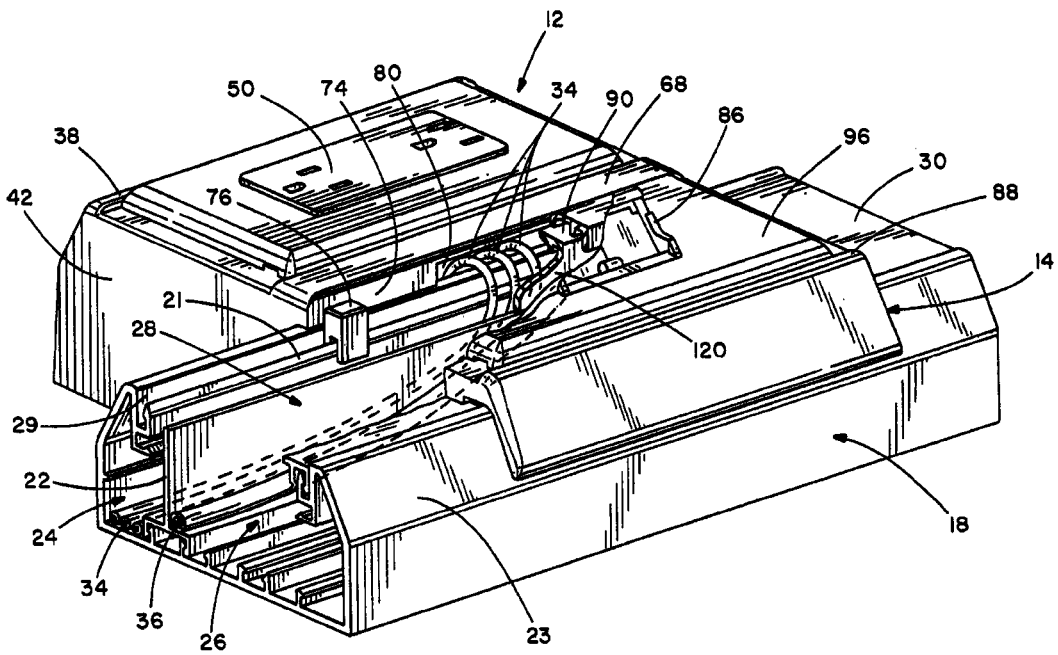

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–24 is confirmed.

* * * * *